United States Patent [19]

Miyazawa et al.

[11] Patent Number: 5,359,381
[45] Date of Patent: Oct. 25, 1994

[54] CAMERA CAPABLE OF AUTOMATIC FOCAL DISTANCE CORRECTION UTILIZING STORED CORRECTION DATA SELECTED RESPONSIVE TO A DIRECTION OF MOVEMENT OF A TAKING LENS SYSTEM

[75] Inventors: Azuma Miyazawa, Mitaka; Koji Mizobuchi, Hachioji; Yasuo Yamazaki, Hino, all of Japan

[73] Assignee: Olympus Optical Co., Ltd., Tokyo, Japan

[21] Appl. No.: 54,186

[22] Filed: Apr. 26, 1993

[30] Foreign Application Priority Data

Apr. 30, 1992 [JP] Japan .................................. 4-111815

[51] Int. Cl.⁵ .............................................. G03B 13/36
[52] U.S. Cl. ...................................... 354/400; 354/187; 354/195.1
[58] Field of Search ...................... 354/402, 400, 195.1, 354/195.12, 195.13, 187; 359/684, 696, 697, 698, 823, 824

[56] References Cited

U.S. PATENT DOCUMENTS

| 4,914,464 | 4/1990 | Azuma et al. | 354/400 |
| 4,936,664 | 6/1990 | Haraguchi et al. | 354/195.1 X |
| 5,196,963 | 3/1993 | Sato et al. | 354/400 X |

*Primary Examiner*—W. B. Perkey
*Attorney, Agent, or Firm*—Louis Weinstein

[57] ABSTRACT

In a camera of the present invention, an extension amount of a focusing lens is determined from a plural kind of table data for determining the extension amount of the lens from information on the distance to an object and information on the set focal distance.

The camera has a storage unit for storing the zooming direction of an optical system during zooming, a selection unit for selecting data from the plural kind of table data on the basis of the contents stored in the storage unit, and an arithmetic unit for computing an extension amount of a focusing lens on the basis of the data selected by the selection unit.

20 Claims, 21 Drawing Sheets

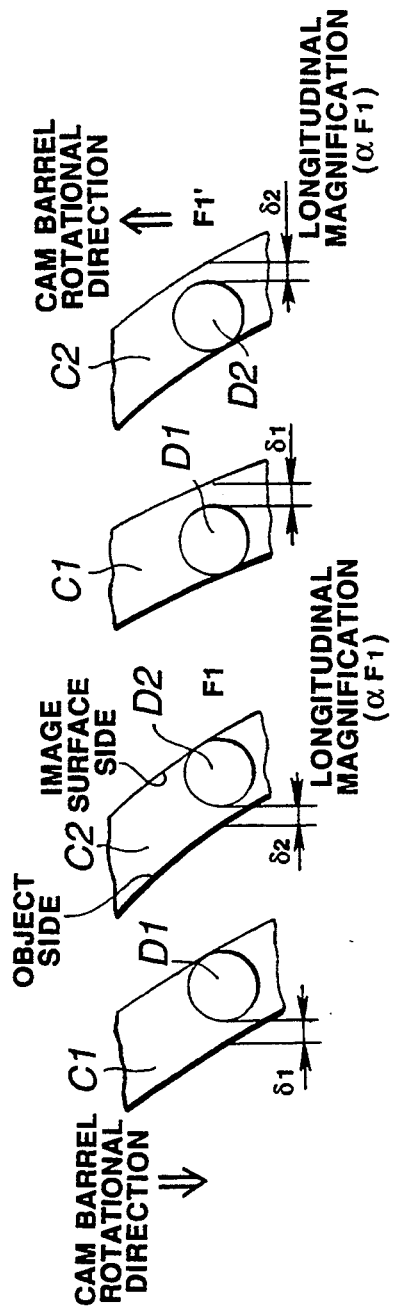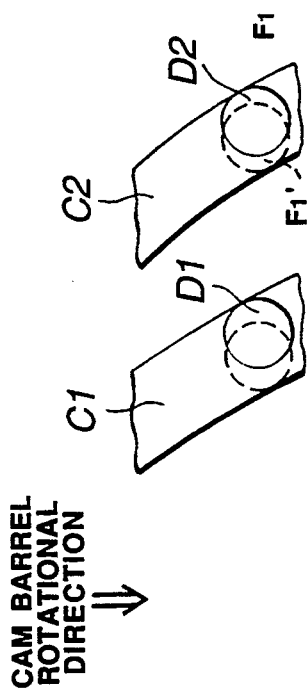

CAMERA CAPABLE OF AUTOMATIC FOCAL DISTANCE CORRECTION UTILIZING STORED CORRECTION DATA SELECTED RESPONSIVE TO A DIRECTION OF MOVEMENT OF A TAKING LENS SYSTEM

BACKGROUND OF THE INVENTION

1. Field of the Invention

The present invention relates to a camera, and particularly to a camera with a zoom lens comprising a focusing means for correcting the deviation of a focal position, which is caused by a variation in a lens.

2. Description of the Related Art

In such a focussing means of a conventional camera, a zoom motor is rotated in a predetermined direction and then stopped for removing backlash which causes a deviation of a focal position as a zoom lens system is moved, as disclosed in U.S. Pat. No. 4,936,664. In another known focusing means, a moving amount of an autofocus lens at a typical zoom position has been previously stored in an ROM so that a shift amount from the value stored in the ROM at each zoom position is stored in a EE-PROM and compensated for by interpolation, as disclosed in U.S. Pat. No. 4,914,464.

However, the means disclosed in U.S. Pat. No. 4,914,464 has a feel of discomfort because the zoom lens system is moved in opposite directions when a zooming operation is made and when the finger pressure is released from a zoom button. The means disclosed in U.S. Pat. No. 4,914,464 has the disadvantage that consideration is given to correction only in the case where a zoom system is moved in one direction.

On the other hand, the amount a general zoom lens is moved for focussing optically depends upon a zoom position when the output of an AF (autofocus) sensor indicates close range, as shown in FIG. 22. Namely, the moving amount of the lens in a telescopic T (referred to as "tele" hereinafter) state is greater than that in a wide angle W (referred to as "wide" hereinafter) state. The difference between the moving amounts in both states is small at infinite range, and gradually increases as the range becomes closer. The focal distances in the W to T states are thus divided so that the extension pulse of the lens is selected according to the output of the AF sensor at a divided focal distance.

On the other hand, for example, a two-group zoom lens optical system uses, for moving the zoom lens system, a cam driving mechanism generally comprising grooved cams and longitudinal pins which are respectively engaged in the grooved cams. A driving grooved cam for moving a first lens group comprises a lead cam, and a driving grooved cam for moving a second lens groove comprises a nonlinear cam. The distance between the first and second lens groups is large in the W (wide) state and is small in the T (tele) state. This is because the cam diagram is formed so that the focusing amounts fc in the W to T states are the same at infinite range. The lens is moved for focusing in such an amount as described above by rotating the focusing cam using a motor or the like.

A relation between a grooved cam for moving a zoom lens and a cam follower in a zoom optical system is described below. Most of such cam mechanisms comprise a cam groove hole formed in a rotatably disposed cam barrel and a cam follower comprising a roller pin inserted into the cam groove hole and planted in a lens holding frame disposed in the cam barrel so as to be movable in the direction of the lens optical axis. Looseness thus occurs between the cam groove hole and the roller pin.

FIGS. 23A to 23C show the relationship. Assuming that a cam groove hole for driving a first lens groove is C1, a cam follower for the first lens group is D1, a clearance produced between the cam groove hole C1 and the cam follower D1 and causing looseness therebetween is $\delta 1$, a cam groove hole for driving a second lens group C2, a cam follower D2 for the second lens group, and a clearance produced between the cam groove hole 2C and the cam follower D2 and causing looseness therebetween is $\sigma 2$, when a zooming operation is stopped at a focal distance F1 in the zooming direction of W→T, the cam followers D1 and D2 constantly contact the image surface sides of the cam groove holes C1 and C2 (i.e. the right-hand sides in FIG. 23A), thereby producing the clearances $\delta 1$ and $\delta 2$ on the subject (i.e. left hand) sides of the cam groove holes C1 and C2, respectively, as shown in FIG. 23A. Conversely, when a zooming operation is stopped at the focal distance F1 in the zooming direction of T→W, the cam followers D1 and D2 contact the object sides of the cam groove holes C1 and C2, thereby producing the clearances $\delta 1$ and $\delta 2$ on the image surface sides of the cam groove holes C1 and C2, respectively, as shown in FIG. 23B.

In this case, if $\delta 1 = \delta 2$, the focusing value fc causes focusing at a position in front of a desired focal point by $\delta 1$. If $\delta 1 \neq \delta 2$, assuming that the longitudinal magnification of the first group cam at the focal distance F1 is $\alpha F1$, the change of the value fc is calculated by the following equation:

$$(\delta 1 - \delta 2) \times \alpha F1 + \delta 2$$

Focusing is made at a position in front of a desired focal point by the changed value.

However, attention must be paid to the fact that the focal distance only slightly changes during the actual zooming operation. Namely, when the value of the focal distance is detected by an encoder, the actual focal distance F1' is deviated from the focal distance value F1 of the encoder by the clearance $\sigma 1$ or $\sigma 2$, as shown in FIG. 23C.

This phenomenon is described in further detail below. If the output of the AF sensor is i, when the zooming operation is stopped after the lens is moved from the W state to the T state, the extension pulse obtained by using the data of the focal distance F1 is STi, as shown in FIG. 22. When the zooming operation is stopped after the lens is moved from the T state to the W state, the extension pulse obtained by using the focal distance F1' is STi'. Even if the output value of the zoom encoder is the same value F1, data on zooming in the direction toward the T state is thus different from data on zooming in the direction toward the W state.

In order to eliminate the effect of the above phenomenon, both data on zooming in the direction toward the T state and data on zooming in the direction toward the W state are thus stored for the same zoom encoder value so that the focusing value fc can be corrected.

The focusing value fc can also be corrected by providing two systems of data for correcting error of the lens focusing value fc including data on zooming in the direction toward the T state and the data on zooming in the direction toward the W state, as disclosed in the above U.S. Pat. No. 4,914,464.

SUMMARY OF THE INVENTION

Accordingly, an object of the present invention is to provide a camera comprising focal point correction means which can solve the above-described problem, and which enables the realization of drive of a zoom lens according to a zooming operation, and correction of the deviation of a focusing position caused by variation in a lens.

Another object of the present invention is to provide a camera with a zoom lens comprising storage means for storing the deviation of a focusing position caused by variation in lens when a zoom optical system is driven toward the tele side and when it is driven toward the wide side, and focal point correction means which can correct the deviation caused by variation in lens, and which has no feel of discomfort.

In a word, the present invention provides a camera in which a moving amount of a focusing lens is determined by a plural kind of table data for determining a moving amount of the lens from information about the distance to an object and information about the set focal distance, comprising storage means for storing the zooming direction of an optical system during zooming, selection means for selecting data from the plural kind of table data on the basis of the contents stored in the storage means, and arithmetic means for computing the extension amount of the focusing lens on the basis of the data selected by the selection means.

The above as well a other objects and advantages of the present invention will be made clear from the detailed description below.

The present invention enables correction of the variations with lens, and thus enables realization of the drive of the zoom lens according to the zooming operation of a switch and the user to correctly stop the zoom lens at any desired position by a zooming operation without feel of discomfort. The camera with a zoom lens of the present invention can thus solve the problem of a conventional camera of this type.

BRIEF DESCRIPTION THE DRAWINGS

Figure 2:
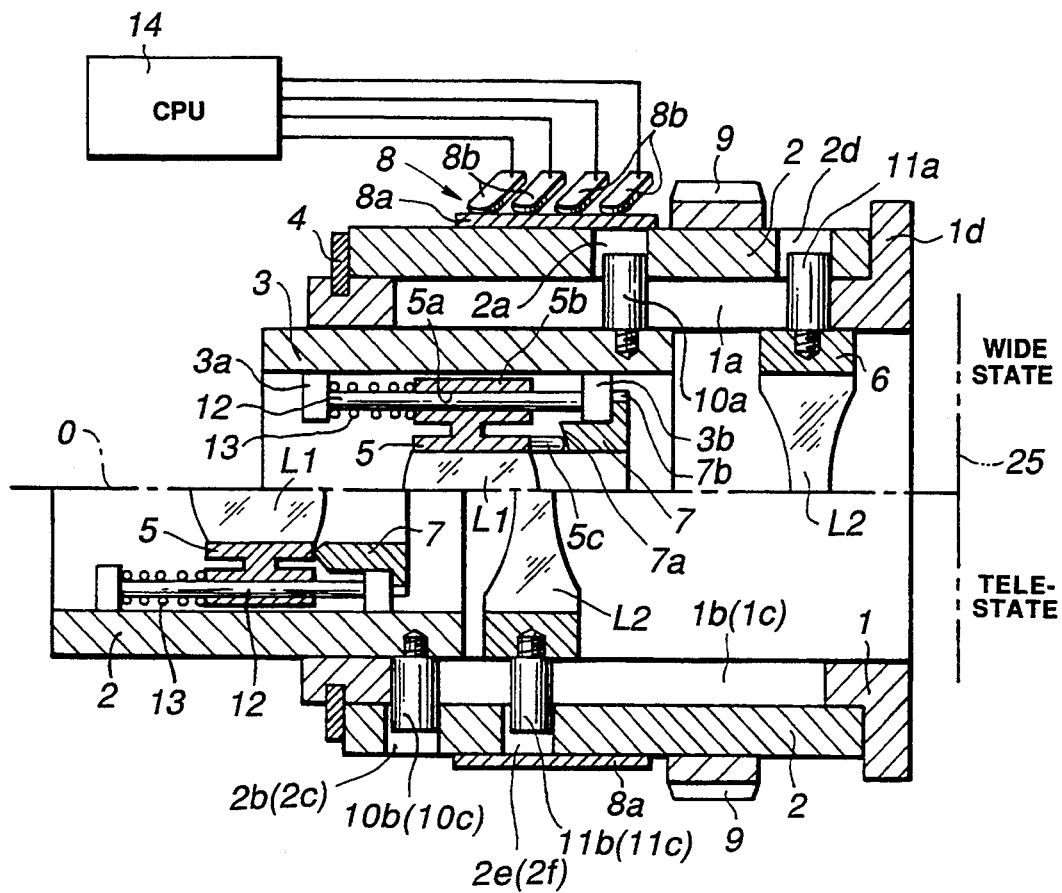
FIG. 2 is a sectional view showing a lens barrel of a camera having focal point correction means according to an embodiment of the present invention.
Figure 3:
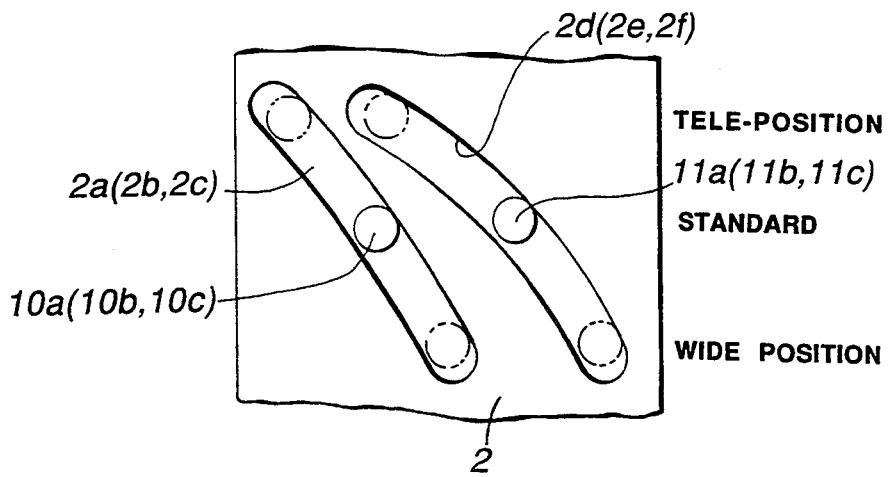
FIG. 3 is a development of a principal portion of a cam barrel showing a relation between a zooming cam groove hole and a cam follower.
Figure 4:
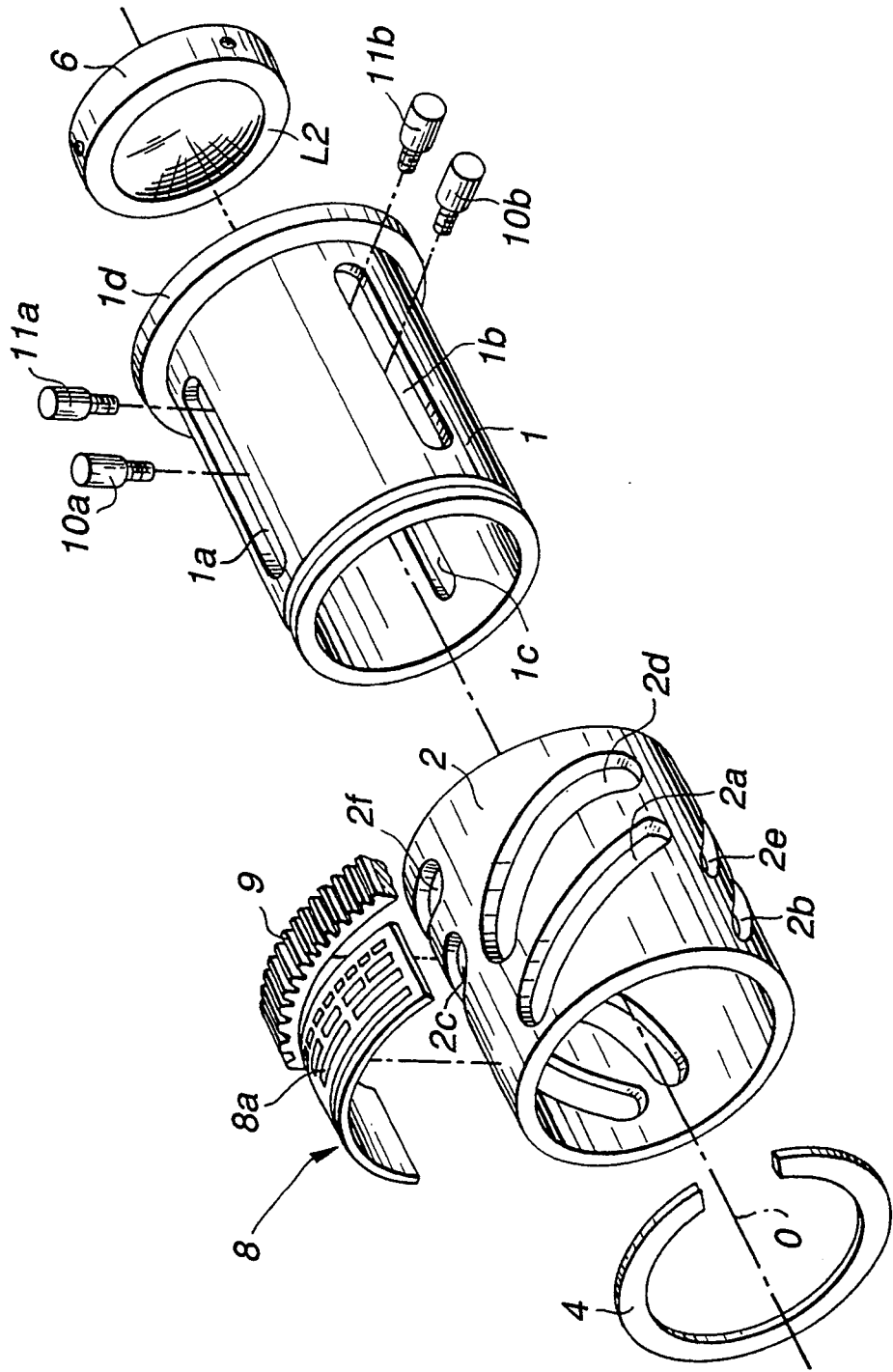
Figure 4B:
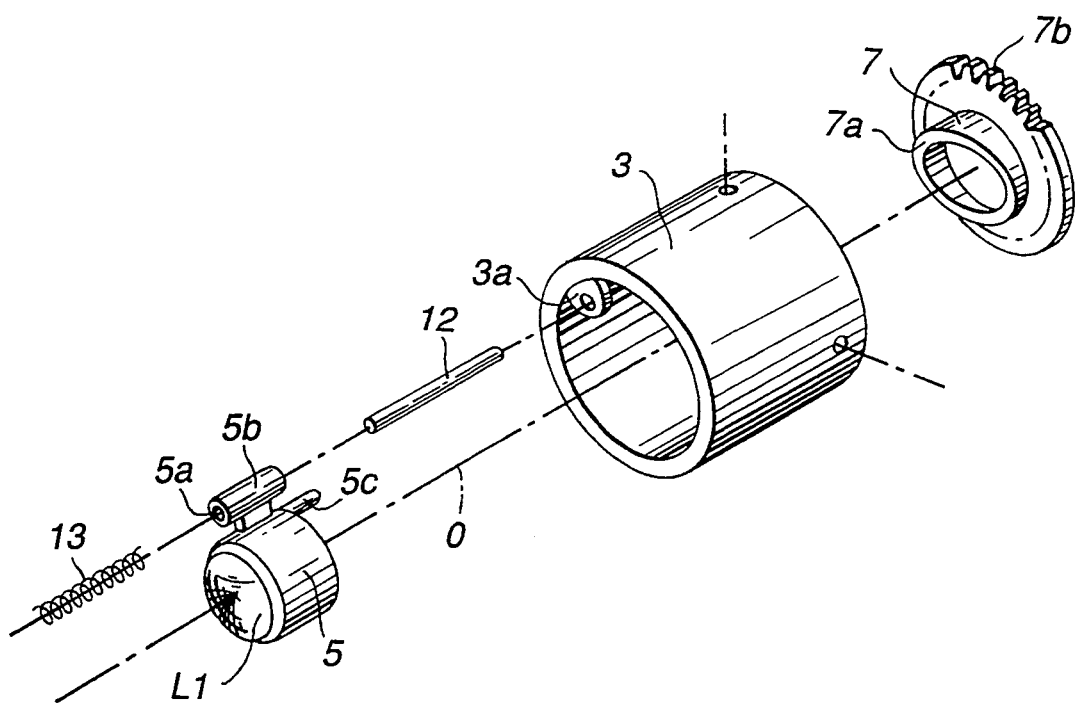
Figure 5:
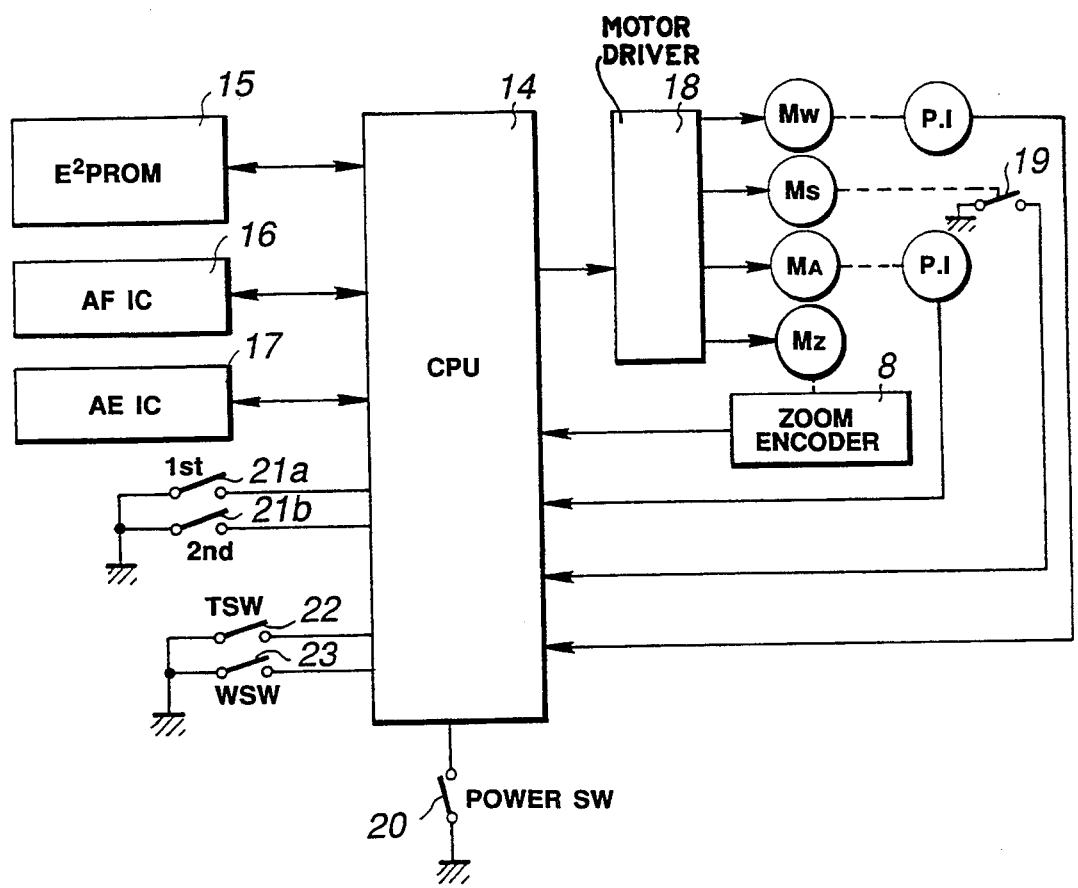
Figure 6:
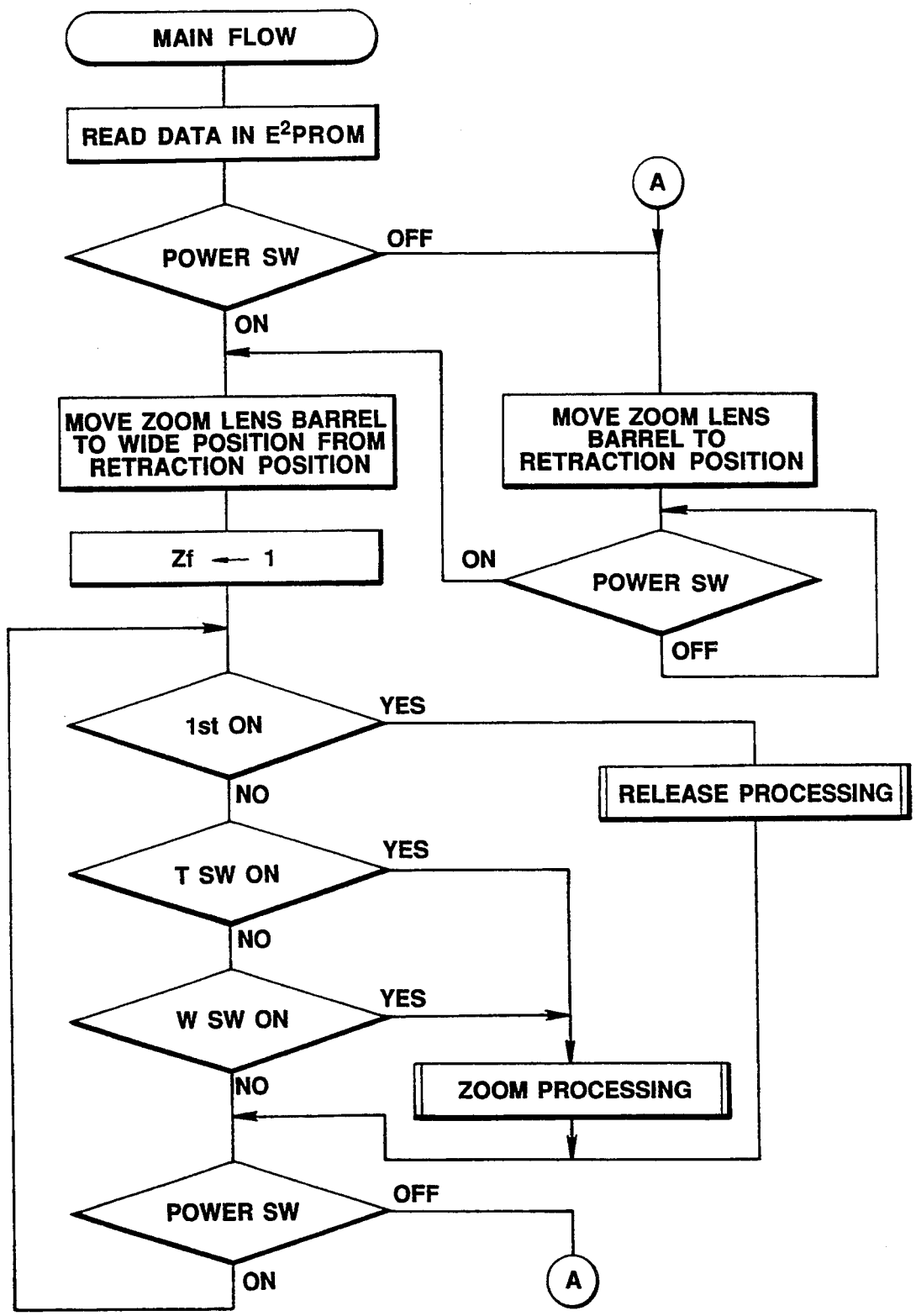
Figure 7:
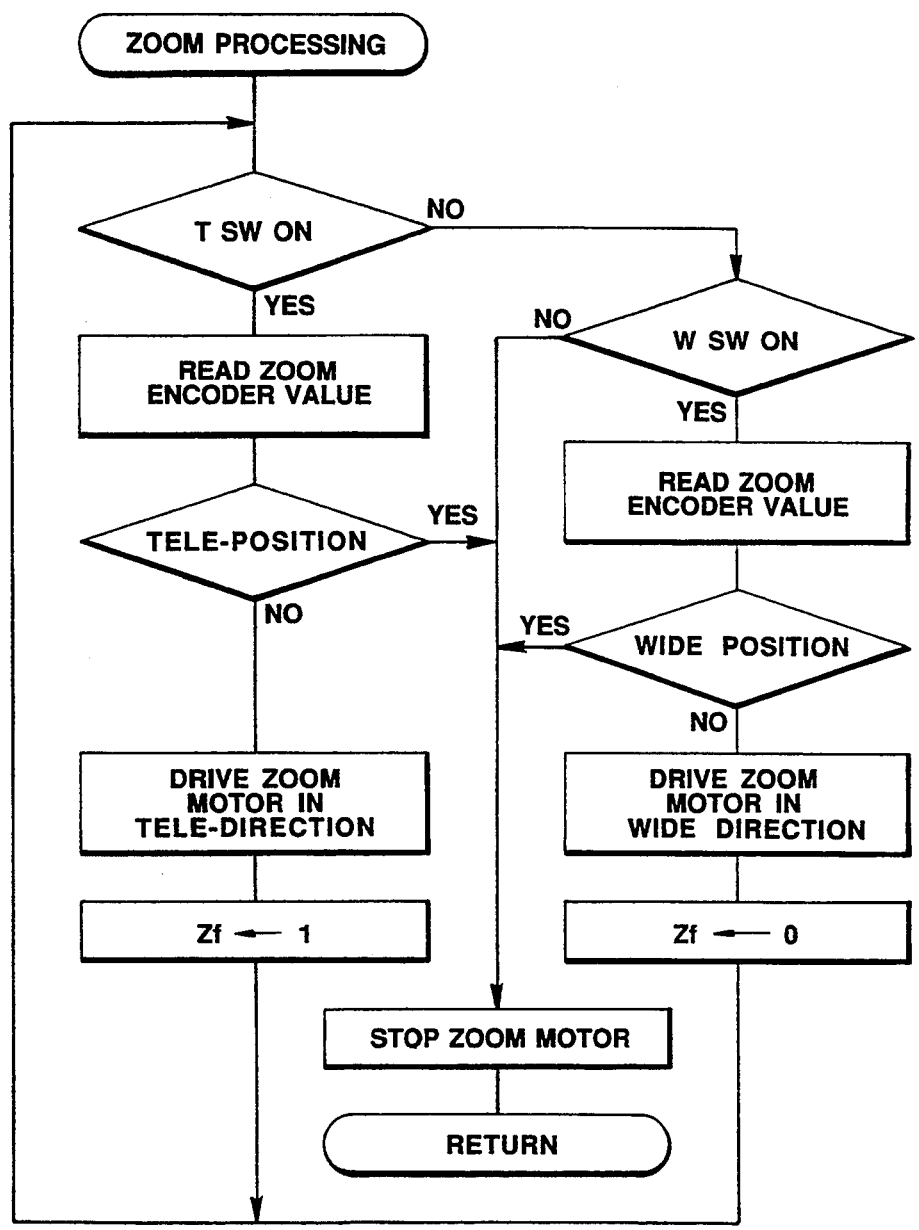
Figure 8:
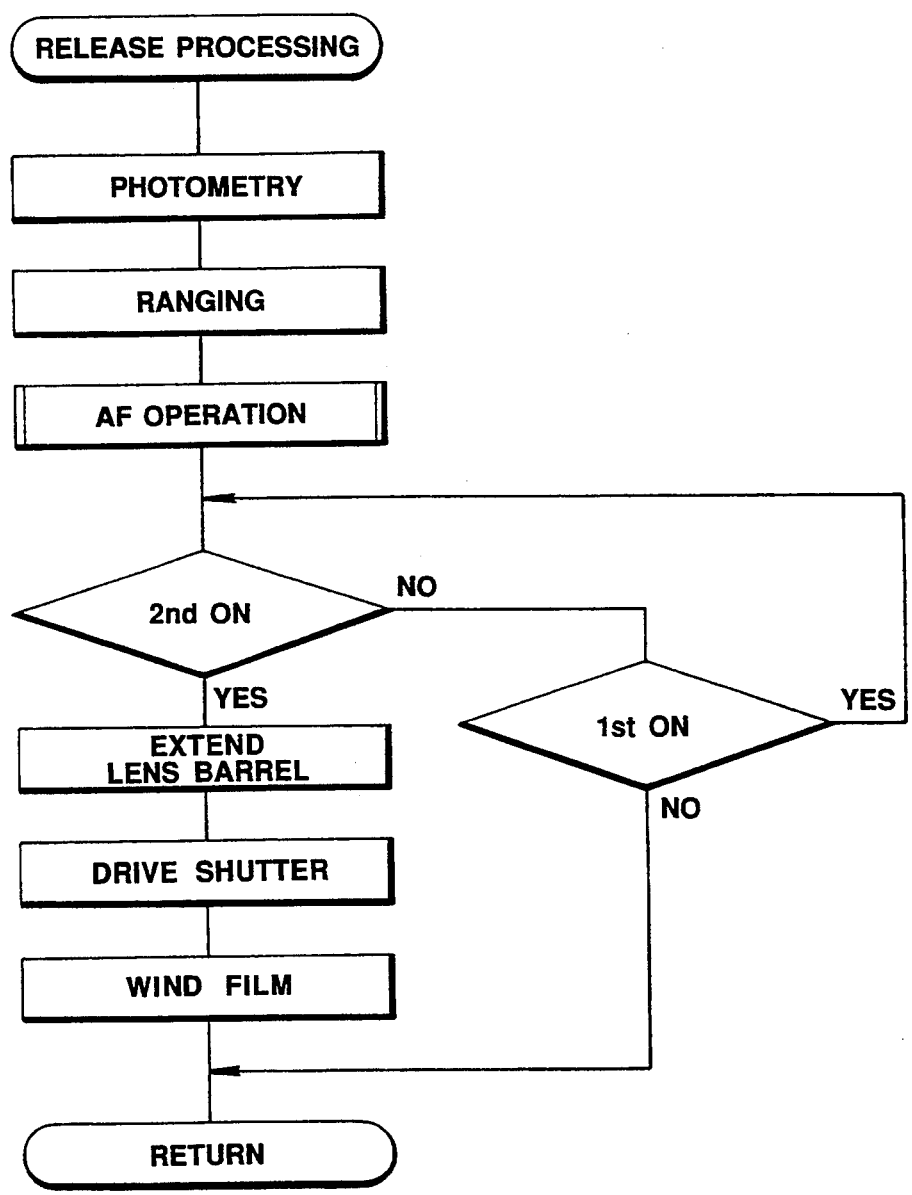
Figure 9:
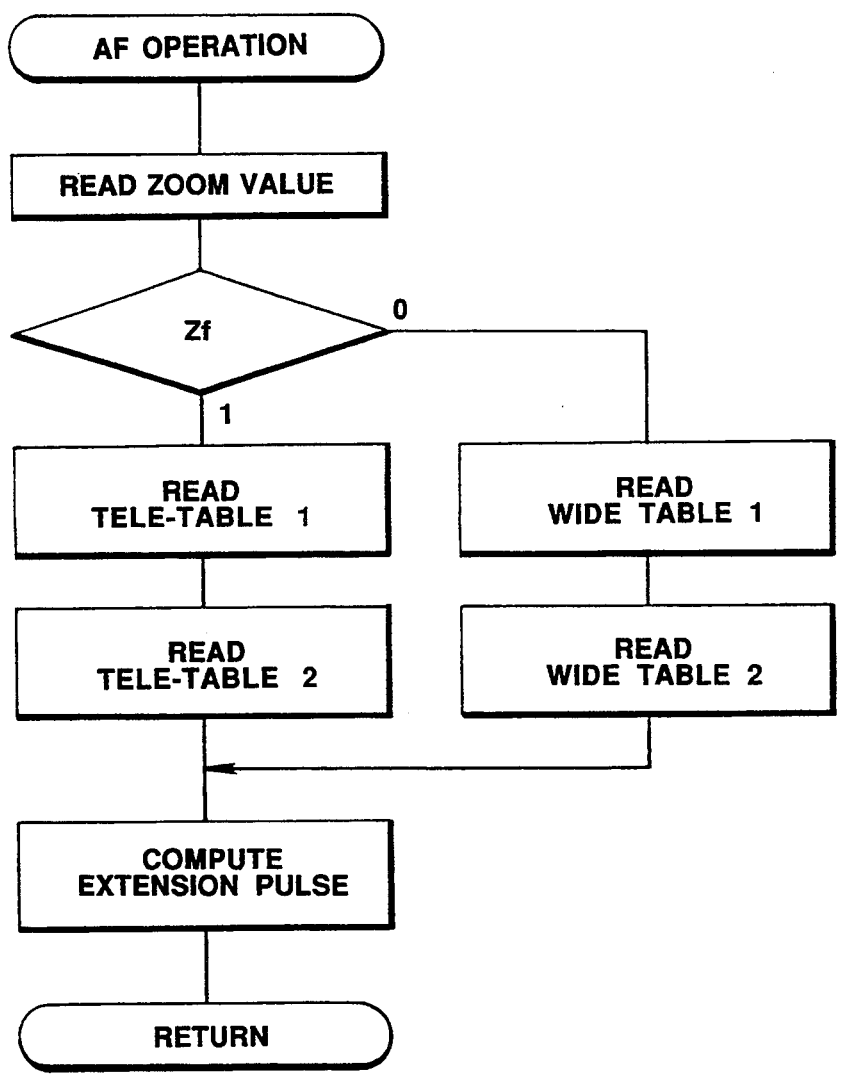
Figure 10:
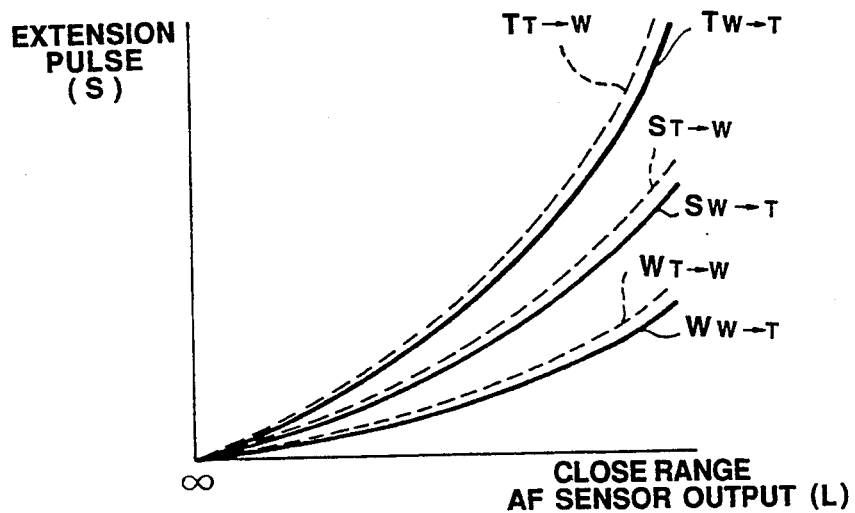
Figure 11:
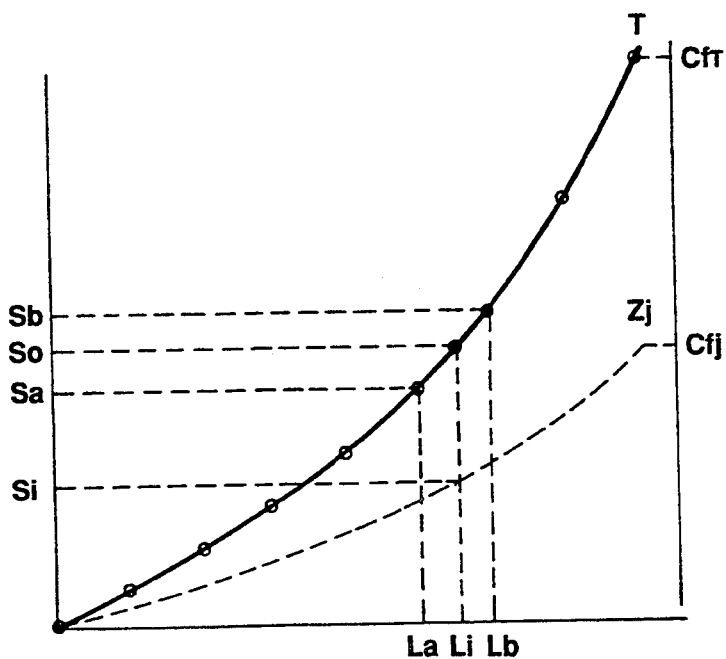
Figure 12:
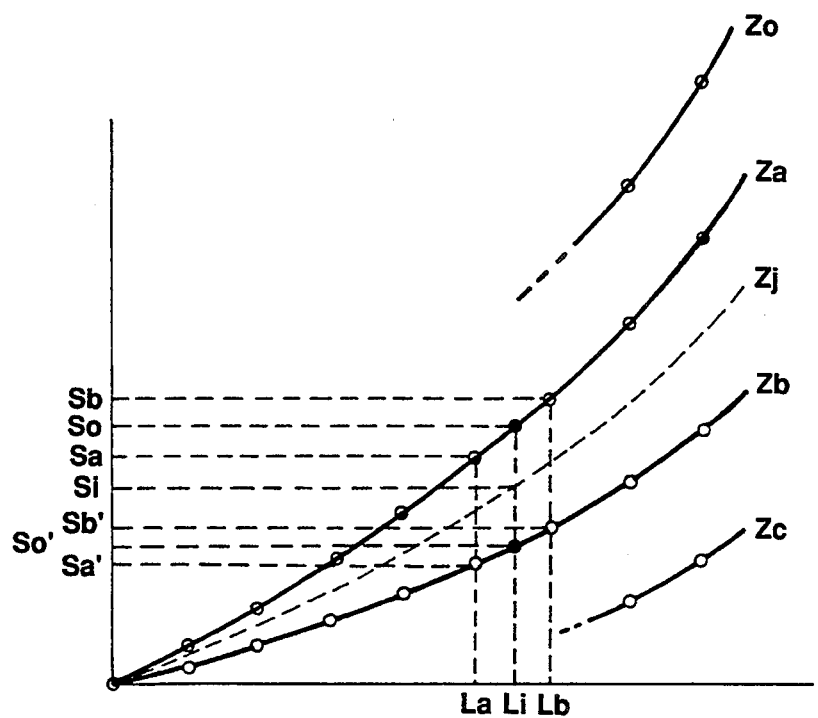
Figure 13:
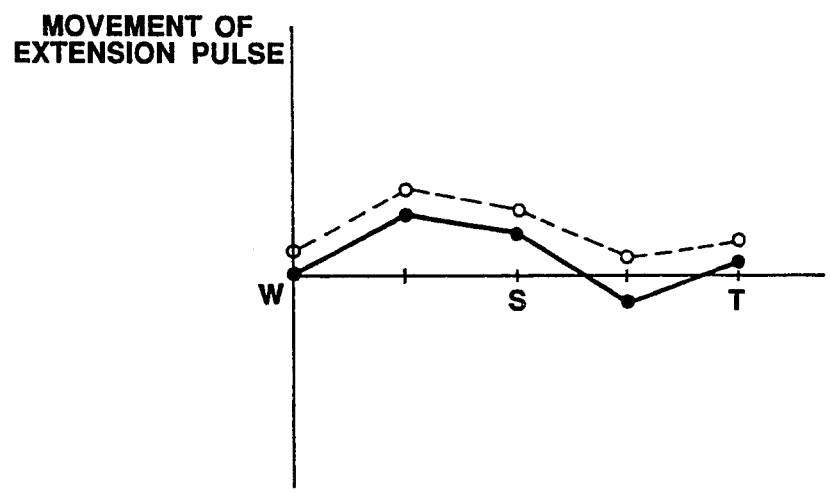
Figure 14A:
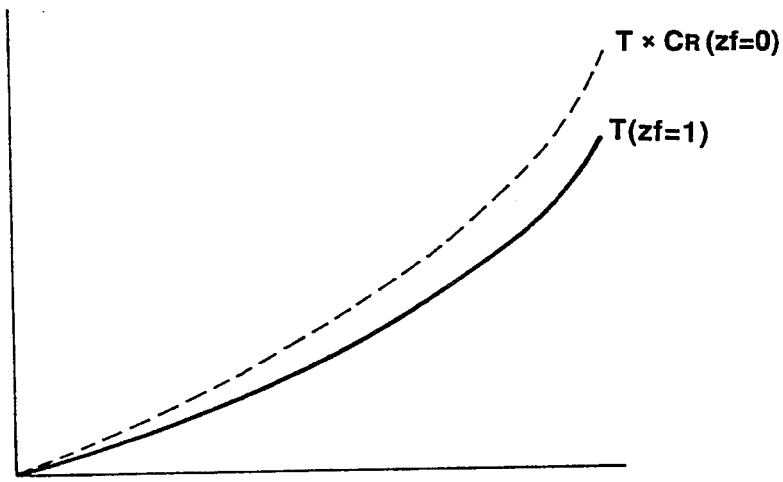
Figure 14B:
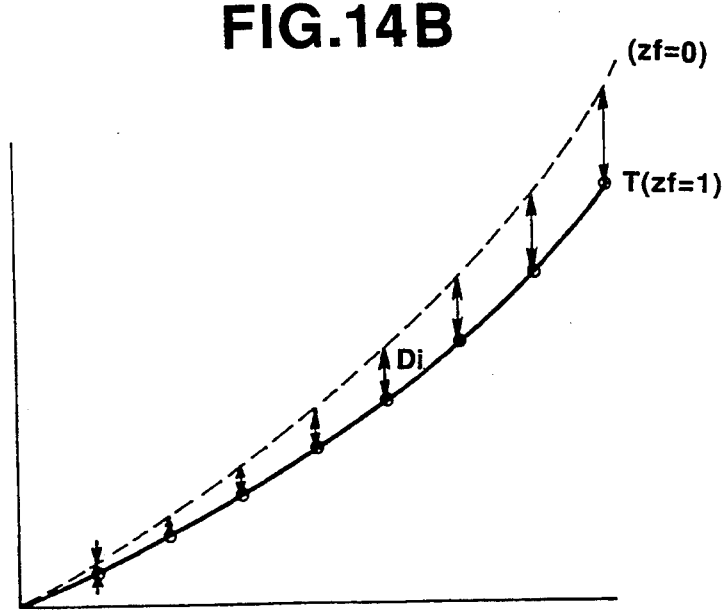
Figure 15:
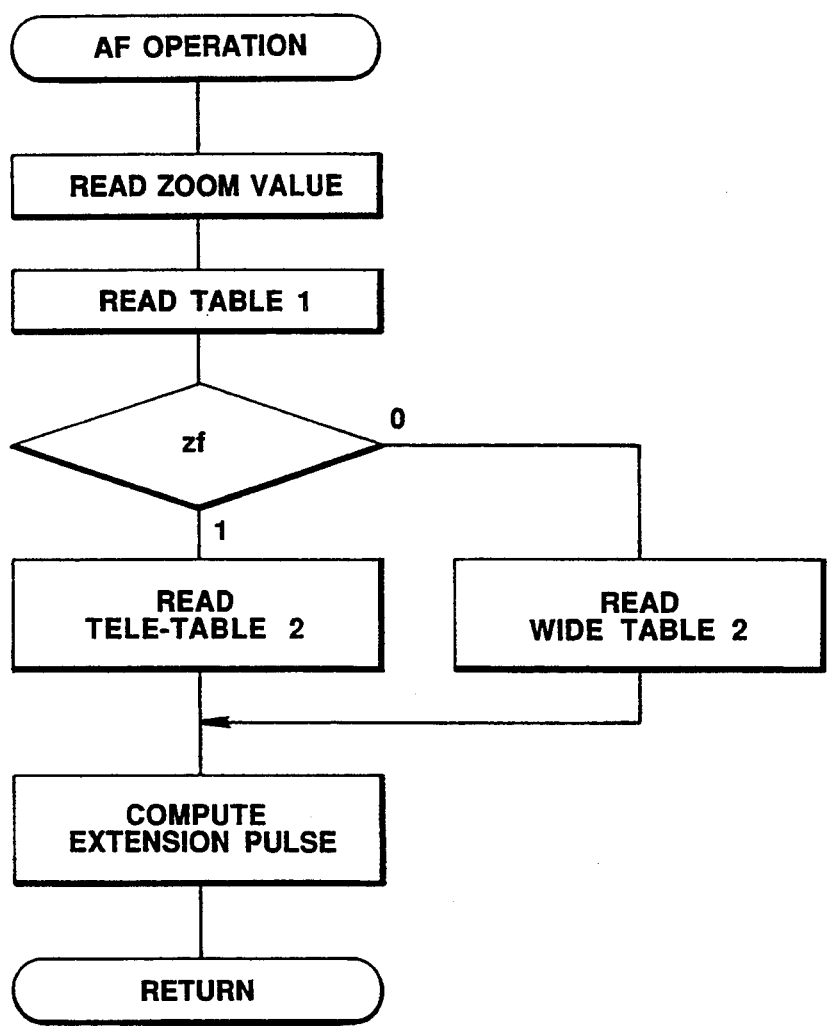
Figure 16:
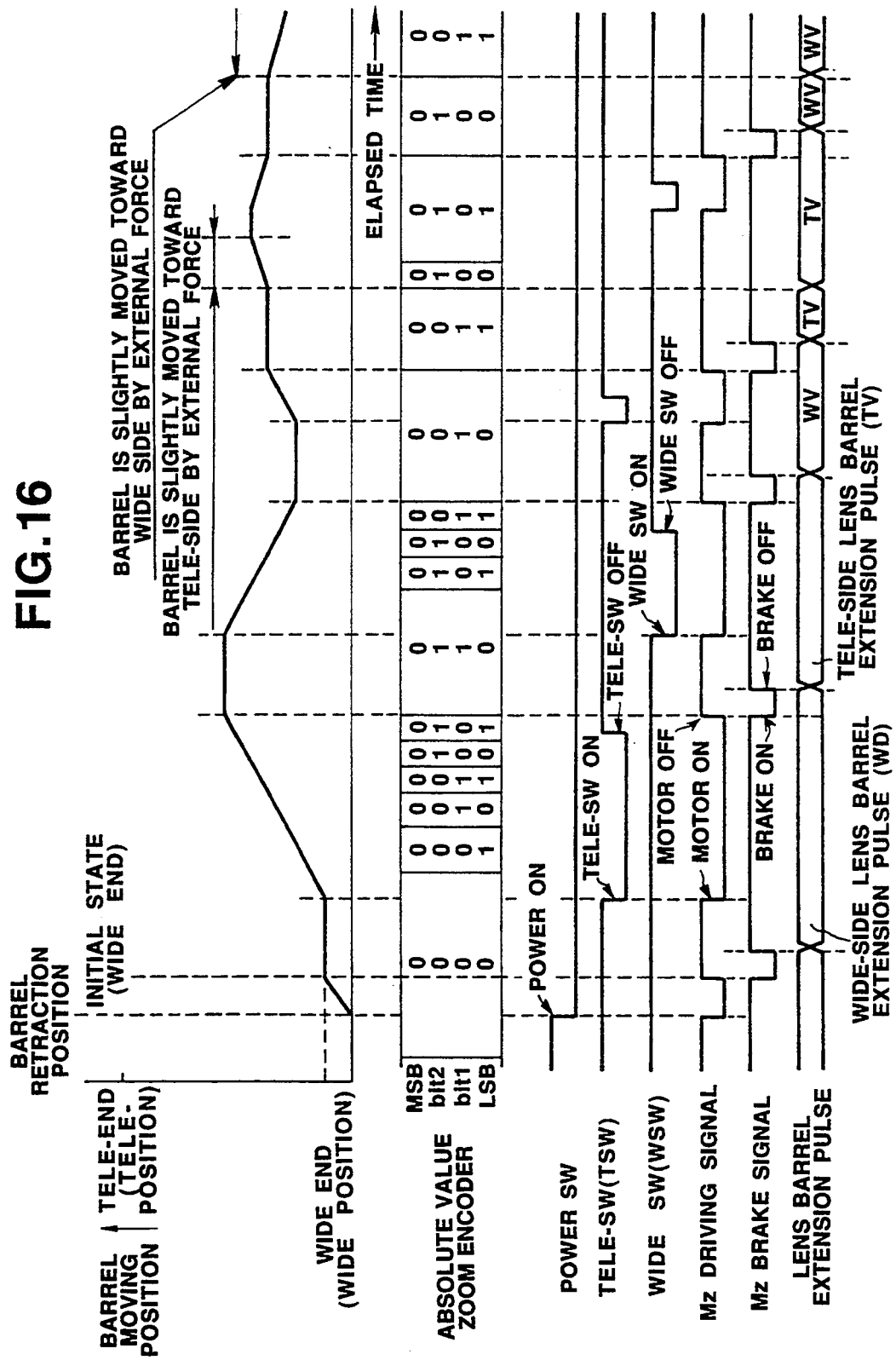
Figure 21:
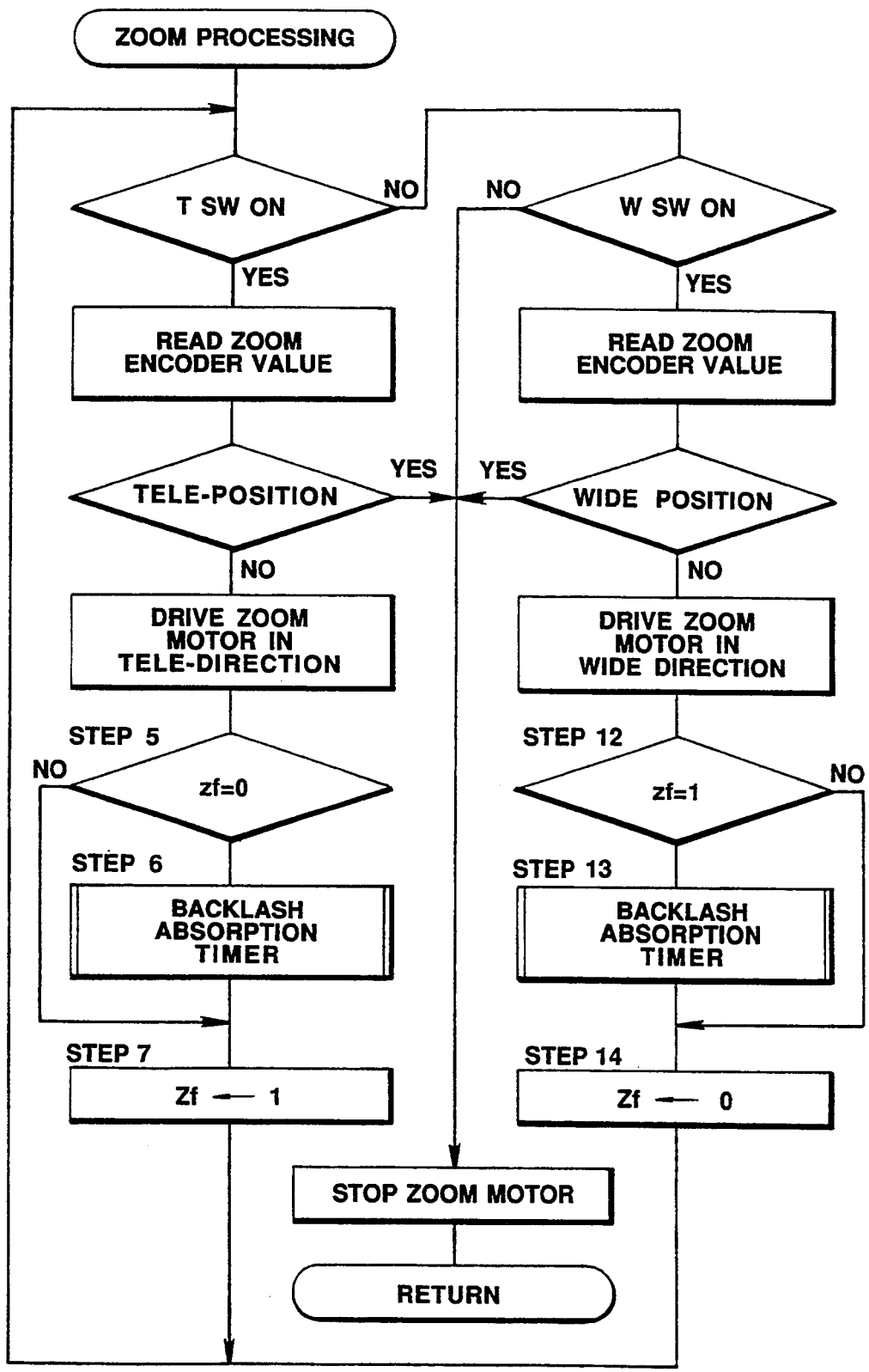
Figure 22:
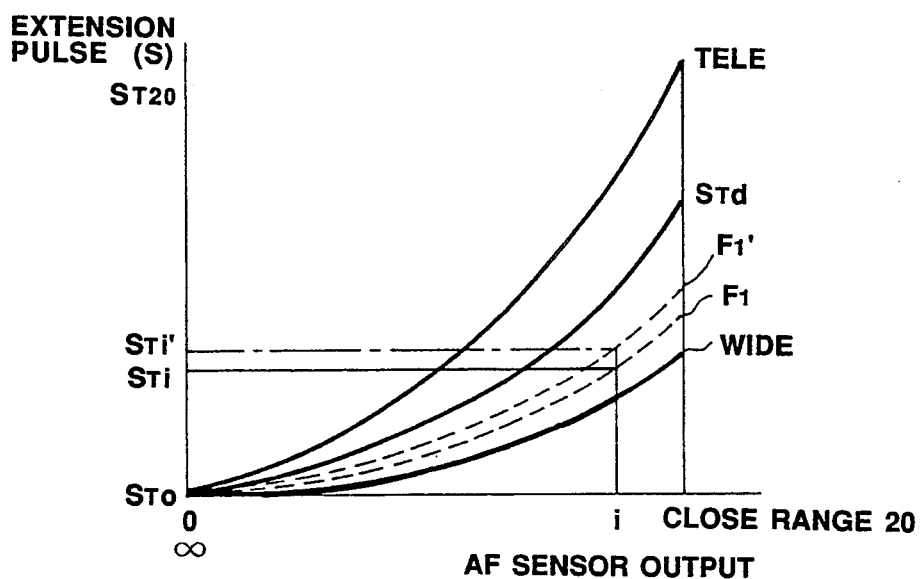
Figure 24:
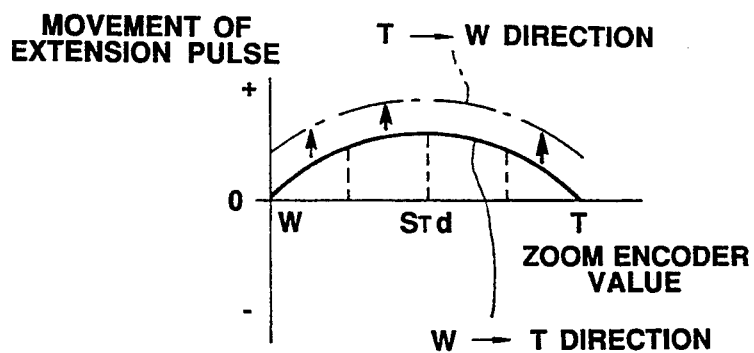

FIGS. 4(a) and 4(b) are respectively exploded perspective views of a fixed barrel, a cam barrel, and a second lens group holding frame, and of a moving barrel, a first lens group holding frame, and a focusing cam in the lens barrel shown in FIG. 2;

FIG. 5 is a block diagram showing the configuration of an electric circuit of a camera having the lens barrel shown in FIG. 2;

FIG. 6 is a flow chart showing the main operation of the camera;

FIG. 7 is a flow chart showing an example of Zoom processing in the camera;

FIG. 8 is a flow chart showing an example of Release processing in the camera;

FIG. 9 is a flow chart showing an example of AF operation processing in the camera;

FIG. 10 is a graph explaining the extension pulse of an AF lens relative to the output of an AF sensor;

FIG. 11 is a graph explaining the reference extension pulse of an AF lens relative to the output of an AF sensor;

FIG. 12 is a graph explaining the reference extension pulse of an AF lens relative to the output of an AF sensor;

FIG. 13 is a graph showing data for correcting a deviation caused by a variation in a lens;

FIGS. 14A and 14B are graphs respectively showing examples of data of AF operation processing in the camera of the present invention;

FIG. 15 is a flow chart showing another example of AF operation processing in the camera;

FIG. 16 is time chart of a subroutine of the Main operation shown in FIG. 6 and the Zoom processing shown in FIG. 7;

FIGS. 17 to 20 are flow charts for detecting the change in the binary value of a zoom encoder caused by an external force;

FIG. 21 a flow chart showing another example of zoom processing in the camera;

FIG. 22 is a graph showing the characteristic of the extension amount for focusing in a general zoom optical system;

FIGS. 23A to 23C are enlarged plan views of a principal portion showing relations among a zooming cam groove hole, a cam follower and a clearance therebetween; and FIG. 24 is a graph showing data for compensating an error of a focusing value fc of a lens.

DETAILED DESCRIPTION OF PREFERRED EMBODIMENTS

Figure 1:
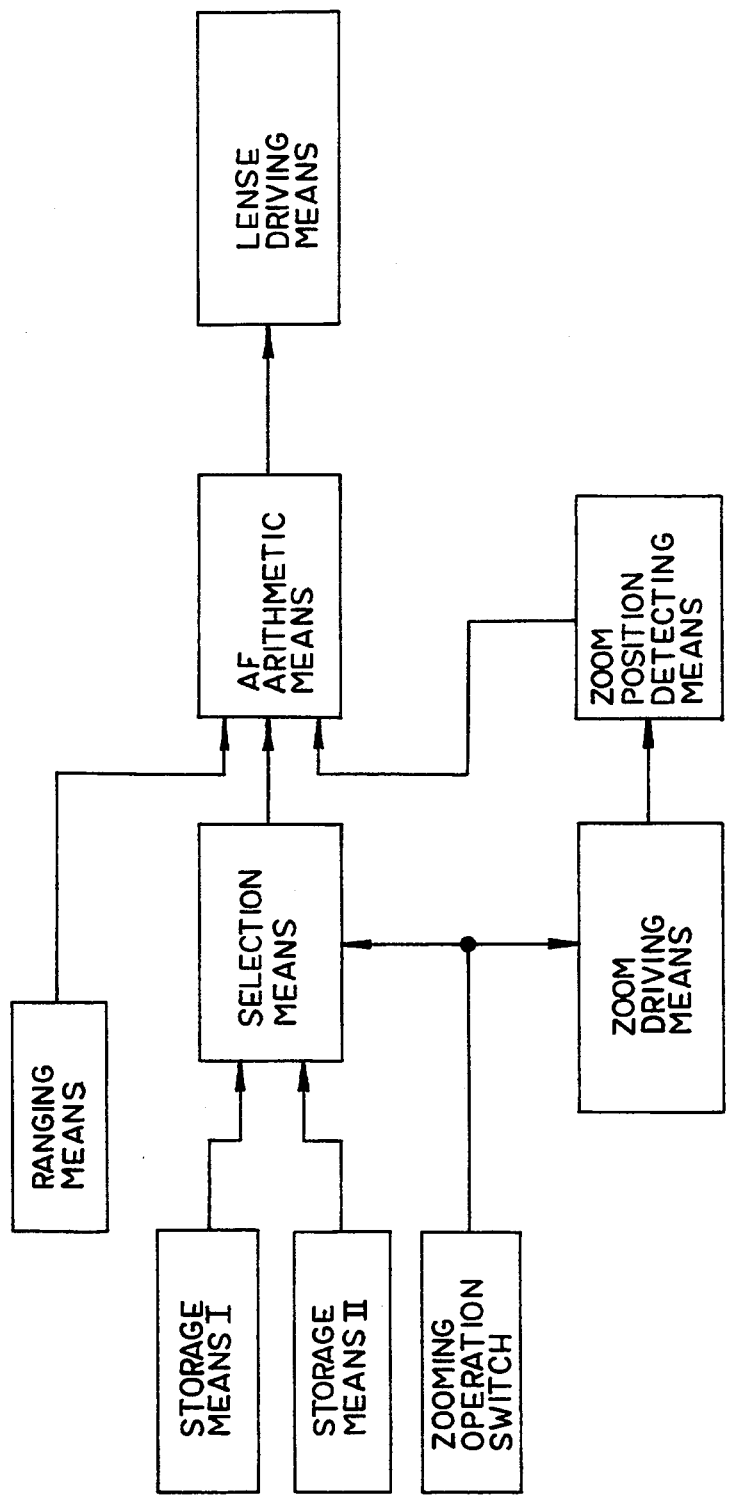
FIG. 1 is a block diagram showing the concept of the present invention.

The concept of the present invention is described with reference to FIG. 1 before embodiments of the present invention are described below.

The present invention provides a camera in which the extension amount of a focusing lens is determined from a plural kind of table data for determining the moving amount of the lens from information about the distance to an object and information about the set focal distance. The camera comprises storage means I and II for storing the zooming direction of an optical system at least during zooming, selection means for selecting data from the plural kind of table data on the basis of the contents stored in the storage means, and arithmetic means for computing the extension amount of the focusing lens on the basis of the data selected by the selection means. Zoom driving means and the selection means are operated by a signal from a zooming operation switch, and one of the storage means I and II which respectively store deviations of the focusing position caused by variation in lens when a zoom lens is driven toward the tele side and the wide side is selected in accordance with the drive direction of the zoom lens so that focal point correcting operation is performed on the basis of the data of the storage means selected and the information from zoom position detection means and ranging means to operate a lens driving means.

FIGS. 2 to 4(a) and 4(b) show the zoom lens barrel in a camera having focal point correction means in accordance with an embodiment of the present invention. In FIG. 2, a wide state of the zoom lens barrel is shown in a upper half, and a tele state thereof is shown in an lower half.

The zoom lens barrel mainly comprises a fixed barrel 1 mounted on a camera body (not shown); a cam barrel 2 rotatably engaged with the outer periphery of the fixed barrel 1, inhibited from forwardly moving in a direction along the optical axis O by a C ring 4 engaged with the peripheral groove in the outer periphery of the fixed barrel 1 at the front thereof and inhibited from backwardly moving by a outward flange 1d provided at the rear of the fixed barrel 1; a moving barrel 3 engaged with the inner peripheral surface of the fixed barrel 1 at a position near the front thereof so as to be movable in the direction of the optical axis, and movably supporting a first lens group holding frame 5 on the inside thereof; a second lens group holding frame 6 engaged with the inner peripheral surface of the fixed barrel 1 at a position near the rear thereof so as to be movable in the direction of the optical axis; a focusing cam member 7 disposed in the moving barrel 3; a zoom encoder 8 disposed on the outer peripheral surface of the cam barrel 2; and a cam barrel driving gear 9 fixed to the outer peripheral surface of the cam barrel 2.

The fixed barrel 1 has linear guide groove holes 1a, 1b and 1c which are formed so as to be aligned in the direction of the optical axis at three positions at equal distances in the peripheral direction thereof so as to guide the roller pins 10a to 10c and 11a to 11c below, respectively, serving as cam followers, as shown in FIGS. 2 and 4 (a).

The cam barrel 2 has cam groove holes 2a, 2b and 2c formed therein at equal intervals in the peripheral direction thereof so as to drive the first lens group, and cam groove holes 2d, 2e and 2f formed near the cam groove holes 2a, 2b and 2c, respectively. The roller pins 10a, 10b and 10c which are fixed at equal intervals on the outer periphery of the fixed barrel 3 at the rear thereof are passed through the linear guide groove holes 1a, 1b and 1c, and are inserted into the cam groove holes 2a, 2b and 2c, respectively. The roller pins 11a, 11b and 11c which are fixed at three positions at equal intervals on the outer peripheral surface of the holding frame 6 for holding the second lens group L2 are passed through the linear guide groove holes 1a, 1b and 1c, and inserted into the cam groove holes 2d, 2e and 2f, respectively, for driving the second lens group L2.

Each of the cam groove holes 2a, 2b and 2c for driving the first lens group is formed in a substantially linear grooved cam at an angle, and each of the cam groove holes 2d, 2e and 2f for driving the second lens group is formed in an arc-like curved nonlinear shape. When the cam barrel 2 is rotated in the clockwise direction as the lens barrel is viewed from the front side thereof, the moving barrel 3 and the holding frame 6 are forwardly moved in the direction of the optical axis to establish the tele state. When the cam barrel 2 is rotated in the counterclockwise direction, the moving barrel 3 and the holding frame 6 are backwardly moved in the direction of the optical axis.

On the other hand, the first lens group holding frame 5 folding the first lens group L1 and supported in the moving barrel 3 has a guide portion 5b provided at the upper portion thereof and comprising a relatively thick barrel having a small diameter. A support shaft 12 is movably passed through an axial through hole 5a of the guide portion 5b aligned in the direction of the optical axis. The support shaft 12 is fixed at both ends thereof by fixing pieces 3a and 3b which are provided at front and rear positions on the upper portion of the inner periphery of the moving barrel 3 in the direction of the optical axis so as to be placed between the fixing pieces 3a and 3b in the direction of the optical axis. Thus the holding frame 5 is supported by the support shaft 12 and is guided by the guide portion 5b so as to be moved in the direction of the optical axis. The holding frame 5 usually tends to backwardly move by an extensible coil 13 wound on the support shaft 12 and interposed between the front end of the guide portion 5b and the front fixing piece 3a.

However, the tendency of the holding frame 5 is restricted by the focusing cam member 7 rotatably disposed at the rear portion of the moving barrel 3. The focusing cam member 7 comprises an end cam 7a having a cam surface formed on the front side of a short barrel, and a rotation gear 7b integrally provided on the rear side of the cam 7a. The end cam 7a contacts the pin 5c provided at the rear end of the first lens group holding frame 5. When the rotation gear 7b is rotated by an AF motor MA (refer to FIG. 5) through a gear train, the holding frame 5 is forwardly and backwardly moved in the direction of the optical axis to perform the focusing operation.

A cam barrel driving gear 9 fixed on the outer periphery of the cam barrel 2, as shown in FIGS. 2 and 4(a) engages with a gear train (not shown) from a zoom motor MZ (refer to FIG. 5) so as to be rotated by the zoom motor MZ.

On the other hand, the zoom encoder 8 disposed on the outer peripheral of the cam barrel 2 comprises a conductive plate 8 on which a counting pattern is formed, and a plurality of encoder armatures 8b which are attached to a fixed member and which slide on the pattern of the conductive plate 8a so that the encoder armatures 8b transmit zoom information to a CPU 14.

In FIG. 2, reference numeral 25 denotes a film surface shown by a phantom line. Although, in the above embodiment, the zoom optical system comprises two zoom lens groups, the optical system may comprise three lens groups, four lens groups or the like.

The configuration of an electric circuit of a camera on which the lens barrel configured as described above is mounted is described below with reference to a block diagram of FIG. 5. FIG. 5 shows the configuration only of the sections related to the present invention.

The CPU 14 comprises a one-chip microcomputer for controlling the sequence of the whole camera.

An EE-PROM 15 comprises electrically rewritable non-volatile memory for writing and storing data for correcting the focusing value fc in accordance with the present invention and other adjustment values from adjustment terminals thereof (not shown). An AFIC 16 is a ranging IC, and an AEIC 17 is a photometric IC.

Each of a film winding motor $M_W$, a shutter control motor $M_S$, an AF lens extension motor $M_A$ and a zoom driving motor $M_Z$ is driven by a motor driver 18 comprising an IC, and the motor driver 18 is controlled by the CPU 14.

A photo interrupter P.I is interlocked with the film winding motor $M_W$ so as to detect the amount of the film moved, and a photo interrupter P.I for counting the extension pulses of the AF lens is interlocked with the AF lens extension motor $M_A$. A switch 19 for detecting the reference position of the shutter is interlocked with the shutter control motor $M_S$.

The zoom encoder 8 may be either the type shown in FIGS. 2 and 4(a) or another type in which the zoom position is detected by counting the output of a photo interrupter, as in the photo interrupter P.I for the AF lens extension motor $M_4$.

A switch 21a turned on by pushing a release button to the first stage, a switch 21b turned on by pushing the release button to the second stage, a switch 22 for zooming toward the T side, a switch 23 for zooming toward the W side, and a power switch 20 to bring the camera into a photographic state are also connected to the CPU 14.

The operation of the camera configured as described above is described below.

As shown in a flow chart of FIG. 6, when a power source is first turned on, the main flow is started, and the fc correction data and other adjustment data read in the EE-PROM 15 are read in the RAM of the CPU 14.

The power switch 20 is then checked. If the power switch 20 is turned off, the zoom lens is moved to the retraction position, and turning on of the power switch 20 is waited. If the power switch 20 is turned on, the lens barrel is moved to the wide portion from the retraction position, and the zoom flag Zf is set to "1". The zoom flag Zf indicates the movement direction immediately before the zooming operation is stopped. When the lens barrel is moved from the W side to the T side, the zoom flag Zf is set to "1" and when the lens barrel is moved from the T position to the W position, the zoom flag Zf is set to "0".

The release switch 21a (referred to as "1st release" hereinafter), the T-side zoom switch 22 (referred to as "TSw" hereinafter), and the W-side zoom switch 23 (referred to as "WSw" hereinafter) are then successively checked. If the 1st release is turned on, release processing is performed, and if the TSw or WSw is turned on, zoom processing is performed. In this loop, when the power switch 20 is turned off, the lens barrel is moved to the retraction position, and turning on of the power switch 20 is waited.

FIG. 7 shows an example of the zoom processing.

The TSw and WSw are first checked. If the TSw is turned on, the zoom encoder value is read. When the zoom lens has not yet been at the tele position, the motor Mz is driven in the T direction, and the zoom flag Zf is set to "1". The motor Mz for driving the zoom lens is stopped either when the switch 22 is turned off or when the zoom lens reaches the T position.

Similarly, when the WSw is turned on, the zoom encoder value is read. When the zoom lens has not yet been at the wide position, the motor Mz is started in the W direction, and the zoom flag Zf is set to "0". The motor Mz for driving the zoom lens is stopped either when the switch 23 is turned off or when the zoom lens reaches the W position.

FIG. 8 shows an example of Release processing.

Photometry and ranging operation are first made, and AF operation is then performed. In the AF operation, the focusing value fc is corrected according to the procedure described in detail below.

The release switch 21b (referred to as "2nd release" hereinafter) is then checked. If the 2nd release is turned off, turning on of the switch is waited. During this time, the 1st release is checked. If the 1st release is turned off, the flow returns to the main flow. If the 2nd release is turned on, the lens is moved to the focusing point, and exposure is made by driving the shutter. The film is then wound, and the flow returns to the main flow.

FIG. 9 shows an example of AF operation processing.

Although the concept of correction in this operation is basically the same as that disclosed in the above U.S. Pat. No. 4,914,464, both concepts are different from each other in the following point. In the present invention, there are two kinds of data corresponding to the drive directions of the zoom lens, and one of the two kinds of data is read on the basis of the result of check of the zoom flag Zf so that the extension pulse of the AF lens barrel is computed on the basis of the read data.

For the sake of simplicity, it is assumed that the data shown in FIG. 10 is stored in the ROM table of the CPU 14. FIG. 10 shows the AF lens extension pulse relative to the output of the AF sensor at each zoom lens position. In FIG. 10, data at zoom flag Zf=1 is indicated by a solid line, and data at zoom flag Zf=0 is indicated by a broken line for each zoom value.

The data shown by solid lines is defined as a tele table 1, and the data shown by broken lines is defined as a wide table 1. The data is related to design of the lens, and may be generally set as a table which cannot be changed in the ROM of the CPU 14. However, when the design values are likely to be changed or when the EE-PROM has a sufficient capacity to store data, the data may be stored in the EE-PROM.

FIG. 13 shows data for correcting a deviation of the focusing position caused by variation in lens due to assembly error and a variation in part, the data showing how much the lens extension pulse determined on the basis of lens design and shown in FIG. 10 is shifted at each zoom position for absorbing the deviation. Since this data depends upon assembly of a lens, it is stored in the EE-PROM. Generally, the data on a typical zoom position only is stored so that data for other zoom positions is determined by interpolation. Since this method is disclosed in the U.S. Pat. No. 4,914,464, which is incorporated herein by reference thereto, it is not described in detail below. In FIG. 13, a solid line shows the tele table 1 at zoom flag Zf=1, and a broken line shows the wide table 2 at zoom flag Zf=0.

The method disclosed in the U.S. Pat. No. 4,914,464 is again described below. In FIG. 11, at any desired zoom value Zj, the AF sensor reference extension pulse Si when the AF sensor output is Li is determined by the following method:

This is calculated on the basis of a reference table stored in the ROM of the CPU, e.g., a table (whose values are shown by circles in FIG. 11) of the extension pulse when the zoom lens is at the tele position. The data to be used is first selected from the table on the basis of Li. Since Li is between La and Lb, So can be calculated by the following equation:

$$So = Sa + \{(Li-La)/(Lb-La)\} \cdot (Sb-Sa)$$

Since the counting Cfj at Zi has been already stored, Si to be determined is determined by the following equation:

$$\begin{aligned}Si &= So \times Cfj \\ &= Cfj\{(Li - La)/(Lb - La)\} \cdot (Sb - Sa)\end{aligned}$$

The calculated shift of the extension pulse described above with reference to FIG. 13 is added to the pulse Si determined to obtain an actual extension pulse.

The table 1 may be based on the data shown in FIG. 11 or the data shown in FIG. 12. FIG. 12 shows a method of determining Si by using a table of data on a plurality of reference zoom positions, not a reference table of data for the tele position only.

Although curves Zo and Zc are actually drawn to the origin, the curves are partially shown in FIG. 12 for the sake of simplicity. In the drawing, circles indicate data of the table stored in the ROM of the CPU.

When the zoom value Zi, and the AF sensor data is Li, Si can be determined by expanding the conception shown in FIG. 11. Namely, data is selected from the curves Za and Zb for the table data La and Lb, which are closer to the data Li.

$$So = Sa + \{(Li - La)/(Lb - La)\} \cdot (Sb - Sa)$$

$$So' = Sa' + \{(Li - La)/(Lb - La)\} \cdot (Sb' - Sa')$$

The pulse Si can thus be approximately determined as follows:

$$Si = So' + \{(Zi - Zb)/(Za - Zb)\} \cdot (So - So')$$

Although other methods of determining Si can be considered, the basic characteristic is that two kinds of each of the tables shown in FIGS. 11 and 12 in correspondence with $Zf = 1$ and $Zf = 0$ are stored in the ROM of the CPU.

There are other possible methods in which two kinds of tables need not be stored. FIG. 14A shows an example of methods of determining Si in which for example, only a table at $Zf = 1$ is stored, and a table at $Zf = 0$ is determined by multiplying the table at $Zf = 1$ by a coefficient.

In this case, the T table at $Zf = 1$ can be converted into data at $Zf = 0$ by the equation below.

$$T \text{ data} \times C_R \quad (C_R \text{ is a coefficient})$$

In another possible method, a difference (Di) between table data at $Zf = 1$ and data at $Zf = 0$ is stored and converted, as shown in FIG. 14B. As a matter of course, the table shown in FIG. 13 can be changed to the table shown in FIG. 14A or 14b. When there is substantially no difference (Di) between data at $Zf = 1$ and data at $Zf = 0$, a common table 1 may be used as the tele table 1 and the wide table 2, as shown in FIG. 15. In this case, only the table 2 may be selected based on the value of Zf.

FIG. 16 is a time chart showing a sub-routine of the zoom processing shown by the main flow of FIG. 6 and FIG. 7.

FIG. 16 shows changes in the state of each of a zoom signal for driving the zoom driving motor Mz, a brake signal of the motor Mz, the lens extension pulse (values in the tele tables 1 and 2, and the wide tables 1 and 2) and the zoom encoder value (4-bits absolute value zoom encoder) when the TSw or WSw is operated after the power Sw is turned on.

When the TSw or WSw is operated, the drive signal for the motor Mz is output from the CPU 14 (refer to FIG. 5) to the motor driver 18 (refer to FIG. 5) for zooming the zoom lens in the tele direction or the wide direction, and zooming is started by the rotation of the motor Mz. The binary value of the absolute value zoom encoder changes with the zooming operation. In FIG. 16, the binary value of the absolute value zoom encoder is set so as to increase with zooming in the tele direction and decrease with zooming in the wide direction.

When the tele operation button is continuously pushed (TSw on), the binary value of the absolute value encoder increases with the progress of zooming in the tele direction. However, the brake signal for the motor Mz is output to the motor driver 18 (refer to FIG. 5) at the same time as the TSw is turned off (strictly, when the binary value of the absolute value encoder at the time the TSw is turned off is changed to a next binary value), thereby braking the motor Mz to stop. An appropriate lens extension pulse value (reference table for AF operation shown in FIG. 9) is selected by setting the zoom flag Zf to 1 (tele-direction drive index) or 0 (wide-direction drive index) immediately after the motor Mz is driven in the tele direction or the wide direction, as shown in FIG. 7.

When the WSw is operated, the same control as that in the case where the TSw is operated is made. During control, when an external force is applied to the zoom lens (accurately, the moving barrel 3 shown in FIGS. 2 and 4(b)), i.e., when the zoom lens is mainly pushed or pulled out, the binary value of the absolute value zoom encoder interlocked with the zoom lens changes according to the direction of movement. In this case, the binary value increases when the zoom lens is moved in the tele direction, and it decreases when the zoom lens is moved in the wide direction. FIG. 16 shows the states where the barrel (moving barrel 3) is slightly moved in the tele direction and wide direction by external force. Since the zooming operation is performed in the tele direction and wide direction immediately before the external force is applied, the backlash correction values in both states are respectively switched to TV and WV. However, because the binary value of the absolute zoom encoder is changed due to the application of the external force, the lens extension pulses in both states are respectively switched to TV and WV again (specifically, the set value of Zf is changed).

Figure 17:
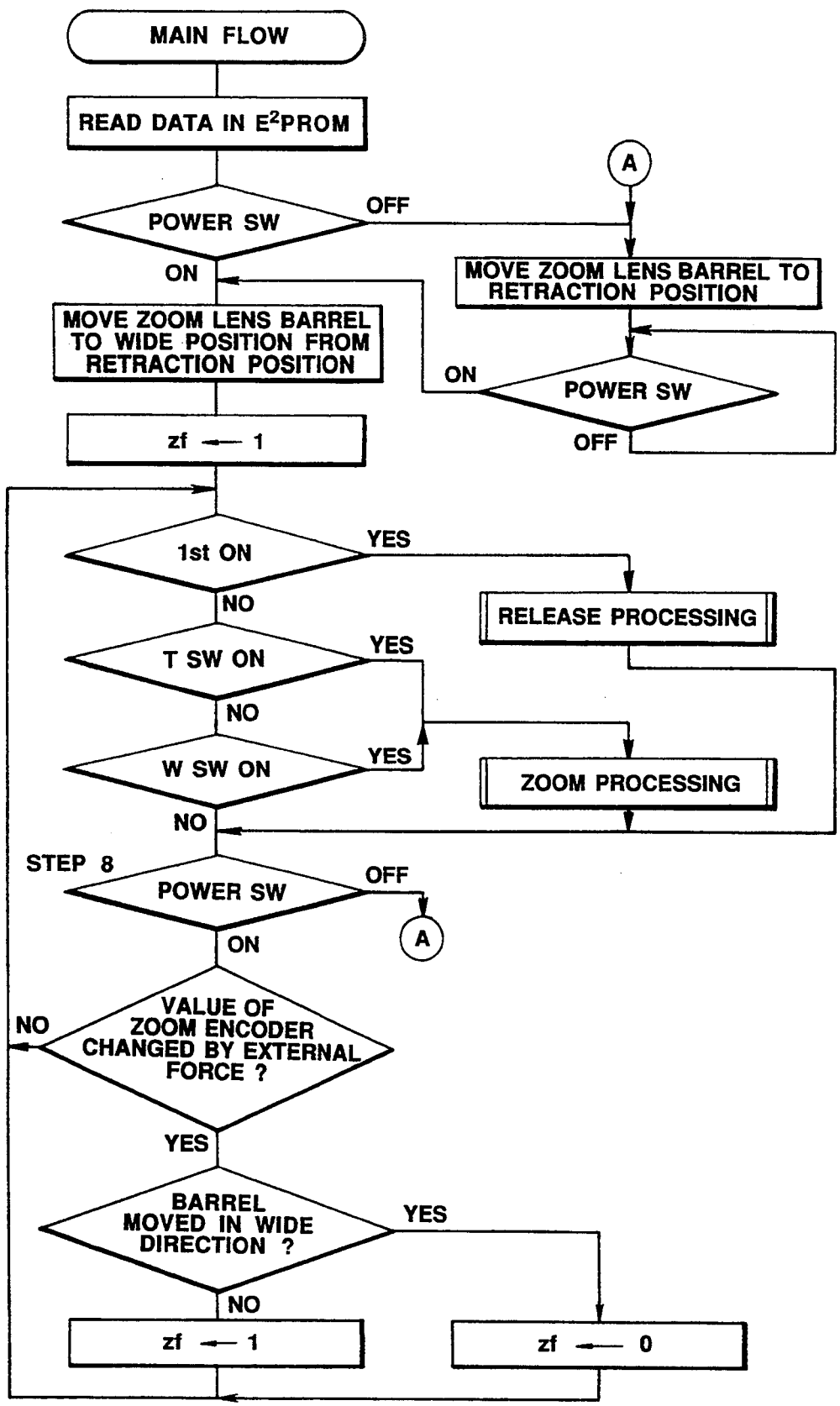

FIG. 17 shows a flow chart for detecting the change in the binary value of the absolute value zoom encoder caused by the external force. The flow chart shown in FIG. 17 is basically realized by slightly modifying the main flow shown in FIG. 6. Namely, when the power Sw is turned on based on the result of decision made in Step 8 of the flow chart shown in FIG. 17, the direction of movement is determined by comparing the presently read value of the absolute value zoom encoder with the binary value thereof read immediately after the zooming operation is completed. If the two values are equal to each other, the zoom lens is not moved. If the two values are different, the Zf value is again set according to the direction of movement on the basis of the result of comparison.

When an incremental zoom encoder is used in place of the absolute value zoom encoder, zoom control can be realized by detecting a change in the time-series pulse signal of the zoom encoder. If the direction of movement of the barrel caused by the external force is limited to one direction (wide direction), it is sufficient to set the Zf value to 0 at the same time as a change in the pulse signal is detected.

Figure 18:
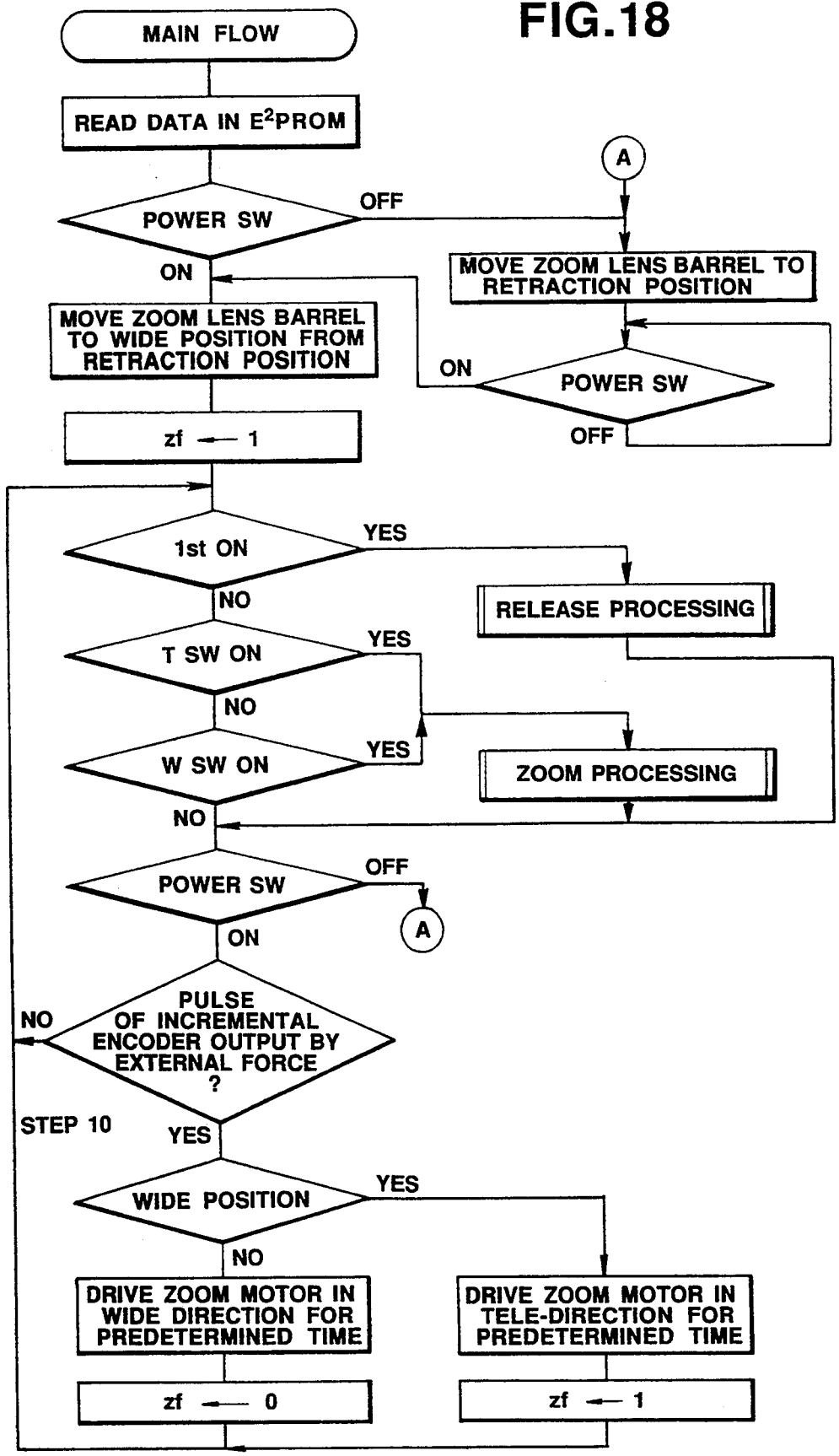

Although the operation when a change in the pulse signal is detected is basically the same as the main flow shown in FIG. 17, the drive direction depends upon the position of the barrel, i.e., the wide position or the tele position. For example, when the barrel is at the wide position on application of an external force, the barrel is driven in the tele direction for a predetermined time, and the Zf value is set to 1. When the barrel is not at the wide position, the barrel is driven in the wide direction for a predetermined time, and the Zf value is set to 0. Conversely, when the barrel is at the tele position on application of the external force, the barrel is driven in the wide direction for a predetermined time, and the Zf value is set to 0. When the barrel is not at the tele position, the barrel is driven in the tele direction for a predetermined time, the Zf value is set to 1. FIG. 18 shows a flow chart for decision on the wide position, and FIG. 19 shows a flow chart for decision on the tele position.

Figure 19:
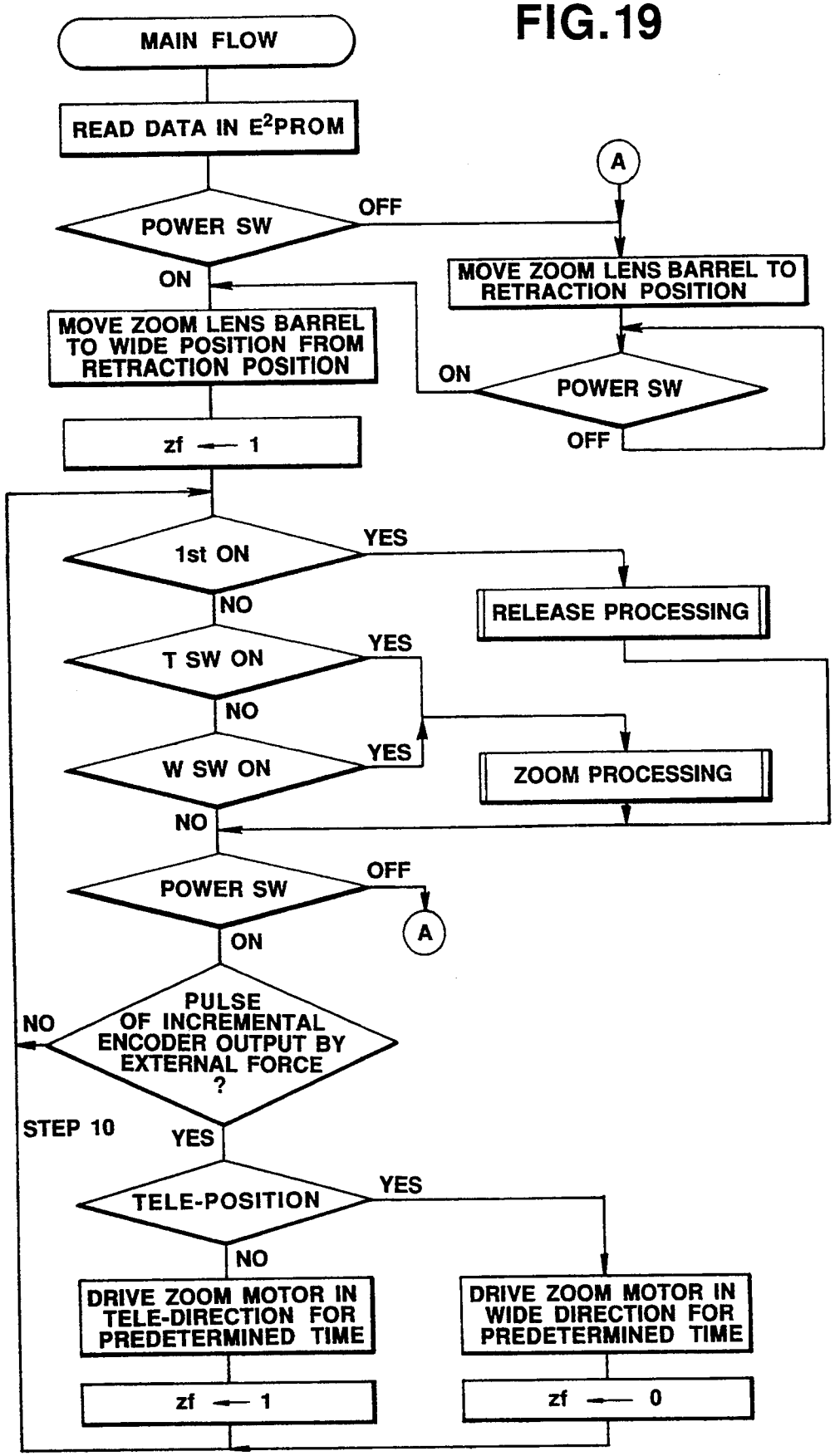
Figure 20:
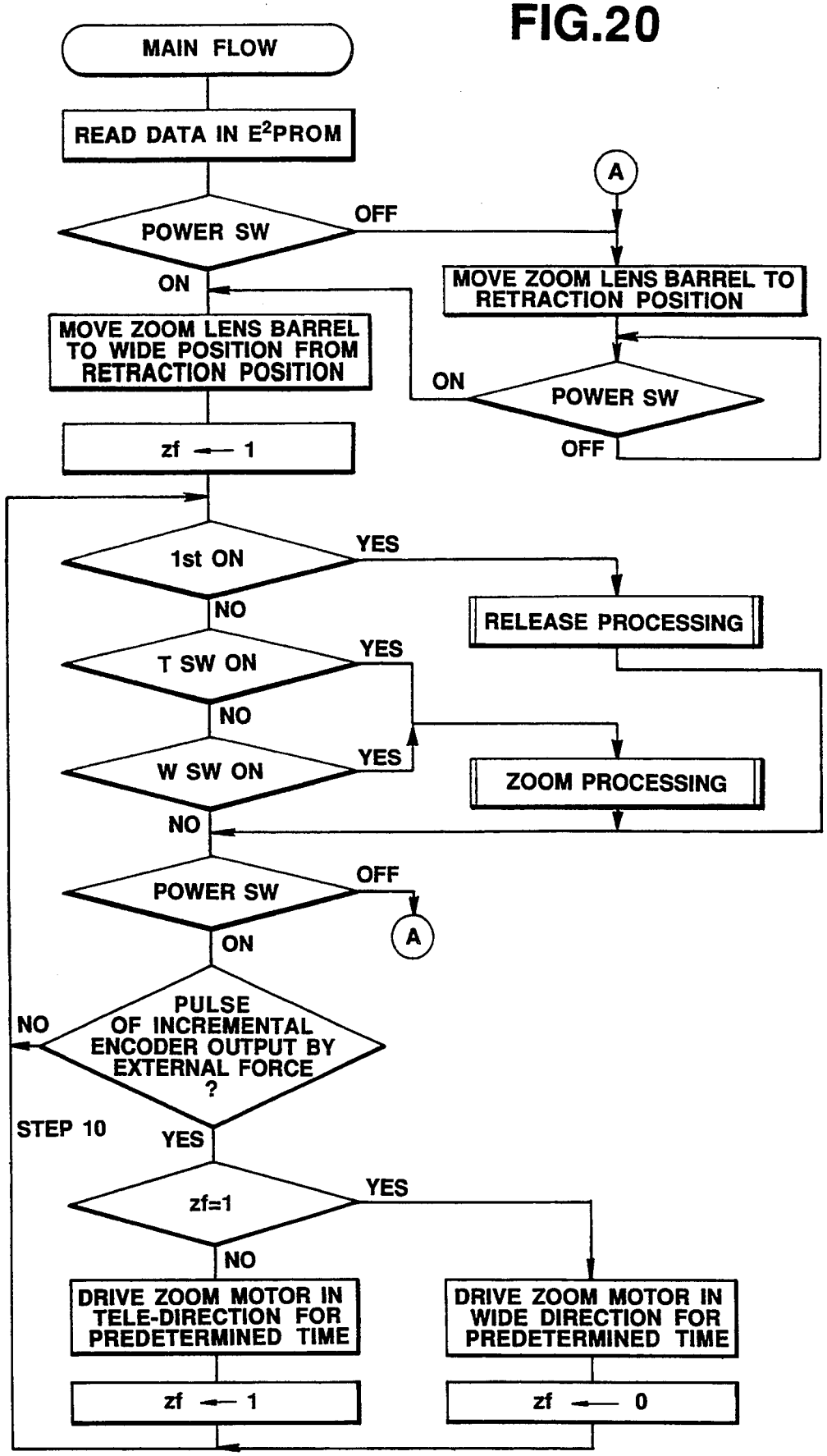

The same control can also be realized by making a decision on the state of Zf immediately before a pulse is output from the incremental zoom encoder by external force in place of a decision on the presence of the state signal indicating the wide position or tele position, which is made in Step 10 of the flow chart shown in FIG. 18 or 19. FIG. 20 shows a flow chart for a decision on the state of Zf.

When the direction of occurrence of backlash is limited to the wide direction, if the direction of the final zooming operation during a tele/wide zooming operation is the tele direction, and if the next tele/wide zooming operation is performed by a momentary short closing operation (so-called "quick pushing") of the WSw, drive at least in the wide direction must be performed in an amount greater than backlash (for absorbing backlash).

FIG. 21 shows the zoom processing when the TSw and WSw are momentarily shortly closed. In the drawing, Steps 5 to 7 show the control of the momentary short closing operation of the TSw. Namely, the zooming operation immediately before the TSw is operated is confirmed by determining the Zf state immediately after the zoom motor Mz is driven. When Zf≠0, the Zf value is immediately set to 1, while when Zf=0, the zoom lens must be driven in an amount greater than the backlash because the direction of the zooming operation immediately before the TSw is operated is opposite to the direction of the present zooming operation. The Zf value is thus set to 1 after the zoom motor Mz is driven for a predetermined time on the basis of the backlash absorption timer.

When the WSw is momentarily shortly closed, the processing in Steps 12 to 14 of the flow is executed in the same manner as that described above. When Zf≠1, the Zf value is immediately set to 0 because the direction of the zooming operation immediately before the WSw is operated is the same (wide direction). However, when Zf=1, the Zf is set to 0 after the zoom motor Mz is driven for a predetermined time on the backlash absorption timer because the direction of the zooming operation immediately before the WSw is operated is the tele direction.

In this way, when the present zooming direction is different from the previous zooming direction, the zoom motor Mz is invariably driven for a predetermined time on the backlash absorption timer.

The zooming drive on instantaneous slight closing can be realized by slightly modifying the flow chart for the zoom processing shown in FIG. 7.

What is claimed is:

1. A camera in which an extension amount of a focusing lens is determined by a plural kind of table data stored in a first storage means for determining a moving amount of said lens from information on a distance to an object and information on a set focal distance, comprising:

second storage means for storing data representing a zooming direction of an optical system during zooming;
selection means for selecting data from said plural kind of table data in said first storage means based on data stored in said second storage means; and
arithmetic means for computing an extension amount of said focusing lens on the basis of the data selected by said selection means.

2. A camera according to claim 1, wherein said plural kind of table data includes table data on zooming of a photographic optical system in the tele direction and table data on zooming in the wide direction, each of which is stored as the extension amount of said focusing lens at each focal distance.

3. A camera according to claim 1, wherein means are provided for selecting another table value on the basis of the table data in said first storage means for zooming of a photographic optical system in a tele direction or a wide direction and conversion data stored in a third storage unit.

4. A camera according to claim 1, wherein means responsive to a change in a focal distance in spite of halting of a zooming operation, is provided for zooming a predetermined amount in a predetermined direction.

5. A camera according to claim 1 further comprising operating means for moving said focusing lens responsive to said arithmetic means.

6. A camera according to claim 5, wherein when means responsive to a present zooming direction which is different from a previous zooming direction, causes further movement of the focusing lens by at least a predetermined amount after said operation means is stopped.

7. A zoom camera comprising:

ranging means;
drive means for driving a zoom lens in response to selectively operating a tele switch and a wide switch;
detection means for detecting a zoom position;
storage means for storing data representing a zoom direction;
arithmetic means for computing a drive amount of a focusing lens from outputs obtained from said ranging means, said zoom position and said zoom direction; and
said storage means storing the zooming direction of the previous zooming drive.

8. A zoom camera according to claim 7, further comprising:

a zoom encoder for generating an output responsive to a lens position;
detection means for detecting a change in a value of said zoom encoder even when a zoom drive switch such as a tele switch or wide switch is not operated; and
driving means for driving said zoom lens in a predetermined direction when a change in a value of said zoom encoder is detected.

9. A zoom camera according to claim 7, wherein when the zooming direction corresponding to operation of one of said tele switch and wide switch is different from a stored zoom driving direction, means responsive thereto is provided for driving said zoom lens for at least a predetermined time even if one of said switches is operated.

10. A zoom camera according to claim 9, wherein means are provided for driving the zoom lens for a predetermined time for backlash compensation.

11. A zoom camera comprising:
ranging means for measuring a distance to an object;
storage means for storing data representing a zoom driving direction;
detection means for detecting a zoom position;
arithmetic means for determining a standard drive amount of a focusing lens from the distance to said object and said zoom position; and
correction means for correcting said standard drive amount of said focusing lens responsive to said zoom drive direction and said zoom lens position.

12. A method of driving a zoom camera lens comprising the steps of:
extending a lens barrel to a photographic ready position when a power source is turned on;
retracting the lens barrel to a retraction position when said power source is turned off;
driving said lens in a tele direction when a tele switch is operated;
driving said lens in a wide direction when a wide switch is operated;
storing a zoom lens driving direction at least at said photographic ready position; and
determining a drive amount for focusing the camera lens on the basis of said driving direction.

13. A zoom camera comprising:
ranging means for measuring a distance to an object;
driving means for driving an optical system in response to operating means to change a focal distance thereof;
focal distance detection means for detecting said focal distance;
storage means for storing data representing a direction of a change in said focal distance;
arithmetic means for computing a drive amount of a focusing lens from a result obtained from said ranging means, said focal distance and a direction of change in said focal distance; and
a zoom direction being stored in said storage means is a direction of the previous change in said focal distance.

14. A method for driving a zoom lens camera comprising the steps of:

(a) determining a distance to an object to be photographed;
(b) moving said lens in a given direction towards an in-focus position;
(c) determining the position of the lens reached during step (b);
(d) selecting a correction amount associated with the position determined in step (c) from a predetermined table of values; and
(e) adjusting the lens according to the correction amount and the given direction of movement of the lens according to step (b).

15. The method of claim 14 further comprising the steps of:
providing in said table a first set of correction values for use when said lens is moved in a first tele direction and a second set of correction values for use when said lens is moved in a second wide direction; and
selecting a correction value from one of said first or second set of values according to the given direction of movement during step (b).

16. The method of claim 14 further comprising providing a table of correction values representing points along a value curve; and
determining a correction value by interpolation between said points when a lens position lies between two stored points.

17. The method of claim 14 further comprising the step of:
moving the lens for an additional distance beyond the adjustment made in step (e) to compensate for backlash.

18. The method of claim 14 further comprising the step of:
providing a table of correction values each associated with a focal point value representing corrections when the lens is moved in a first direction and a constant factor which is to be combined with each correction value to obtain a correction value when the lens is moved in a second direction.

19. The method of claim 18 wherein the step of combining a constant factor with a correction value comprises the step of forming a product thereof.

20. The method of claim 18 wherein the step of combining a constant factor which a correction value comprises the step of summing the correction value and constant factor.

* * * * *